INVENTOR
ALLEN F. FIEDLER
BY Stryker and Jackson
ATTORNEYS

United States Patent Office 3,496,019
Patented Feb. 17, 1970

3,496,019
LEAD-ACID BATTERIES WITH MAGNESIUM METAL FOR ACTIVATING AT LOW TEMPERATURES
Allen F. Fiedler, Minneapolis, Minn., assignor to Gould-National Batteries, Inc., St. Paul, Minn., a corporation of Delaware
Filed May 2, 1968, Ser. No. 726,045
Int. Cl. H01m 39/00, 41/00
U.S. Cl. 136—26     9 Claims

ABSTRACT OF THE DISCLOSURE

This invention relates to the activation of lead-acid batteries at low temperatures by utilizing at a specified physical relationship within the battery casing prescribed and limited amounts of relatively manganese-free magnesium metal having a surface area within the range of about 3–3000 square centimeters per gram.

---

Conventional lead-acid type batteries comprise a plurality of adjacent cells disposed within a casing, each cell containing lead anode plates and lead oxide cathode plates with electrically-insulative separators located between adjacent anodes and cathodes. Each cell generates an electrical current when a suitable electrolyte, such as a dilute mixture of water and sulfuric acid, is placed into the battery casing. It is well known that the ampere-hour capacity of a fresh lead-acid battery is directly related to the temperature of the dilue sudfuric acid electrolyte added to the fresh battery, said electrolyte ordinarily being stored in unheated warehouses. For example, at 80° F. warm weather conditions, ampere-hour capacity of a fresh lead-acid battery activated with 80° F. dilute sulfuric acid is about seven times greater than the ampere hour capacity of a fresh lead-acid battery filled with 0° F. sulfuric acid in cold winter months. Accordingly, under cold weather conditions it is usually necessary to either employ heated warehouses for storing batteries and electrolyte or to provide expensive and time-consuming charging of the battery following activation by injecting cold electrolyte so that the battery will be able to deliver is rated ampere-hour capacity.

It is accordingly the general object of the present invention to provide improvements in lead-acid type batteries which will markedly improve their capacity, particularly when the sulfuric acid electrolyte necessary for activating the battery is injected at cold temperatures.

It is another object of the present invention to provide a lead-acid type battery that will deliver energy at its rated capacity even when environmental conditions necessitate the injection of cold sulfuric acid electrolyte into a similarly frigid battery cell.

It is yet another object of the present invention to provide a method for controllably heating a multi-cell lead-acid battery during a short time interval following the injection of cold sulfuric acid into a similarly frigid battery cell whereupon the freshly-activated battery will be able to deliver its rated capacity.

It is a further object to achieve the foregoing objects without damaging the battery casing or cell components, without boiling the sulfuric acid electrolyte, and without the need of charging the battery.

With the above and other objects and advantages in view, which will become more apparent as this description proceeds, in substance this invention comprises incorporating into the lead-acid battery about 0.05–0.10 mol of magnesium metal for every mol of sulfuric acid electrolyte contained within the battery. Moreover, the magnesium metal must be relatively free of manganese impurities, is preferably present in alloy form and has a specific surface area of at least about three square centimeters per gram and less than about 1500–3000 square centimeters per gram.

In the drawing like numbers refer to like parts in the several views, and

Figures 1, 2:
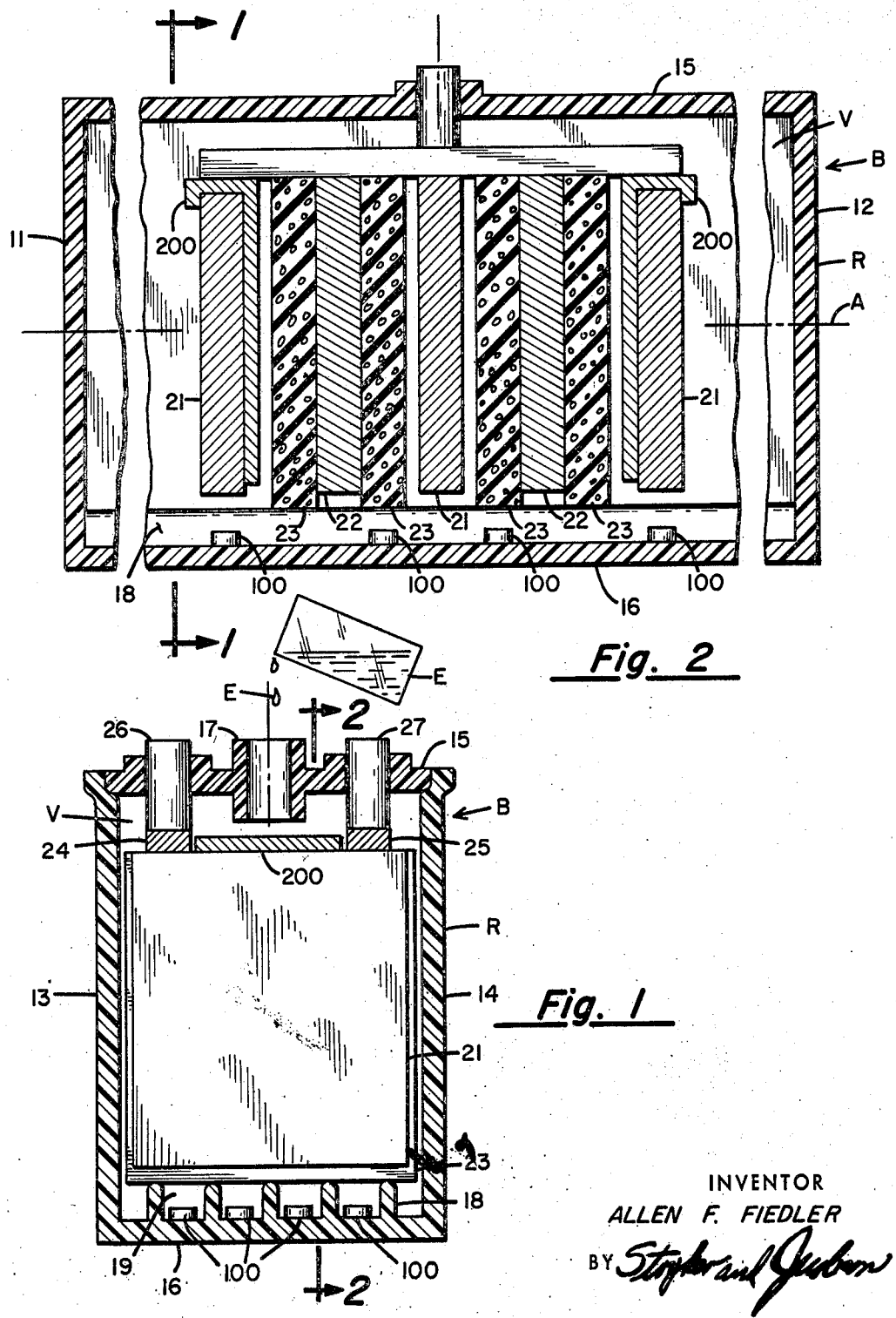
FIG. 1 is a sectional elevational view taken along lines 1—1 of FIG. 2 transverse to the longitudinal axis of the dry-charged lead-acid battery of the present invention.
FIG. 2 is a framentary sectional elevational view taken along lines 2—2 of FIG. 1 to the longitudinal axis of the dry-charged lead-acid battery of the present invention.

The battery B of the present invention contains all the elements of a conventional dry-charged lead-acid battery. The conventional elongate hollow outer casing R has a longitudinal axis A, the casing R being adapted to hold a liquid therein such as an acid electrolyte E. Casing R comprises a pair of upright end panels 11 and 12 disposed transversely of axis A, a pair of upright elongate side panels 13 and 14 disposed along opposite sides of axis A, a substantially horizontal top panel or cover 15 disposed above axis A, and a substantially horizontal bottom panel 16 disposed below axis A, said panels 11–16 all being interconnected to make the casing R liquid tight. Cover 15 has a filling neck 17 of common variety formed integrally therewith through which battery acid E might be poured into the casing. Filling neck 17 has an internally threaded upper end portion adapted to receive a vent plug (not shown). Bottom panel 16 has a pluarlity of upright longitudinal ribs 18 with the space between the ribs 18 providing a sediment wall 19.

The conventional lead-acid battery ordinarily consists of a number of cells C, one such cell being illustrated in fragmentary form in FIG. 2. Each electrolytic cell C includes a plurality of plate-like elements disposed transversely of and spaced consecutively along axis A including lead anode plates 21, lead oxide cathode plates 22, and electrically nonconductive porous separator plates 23. The lead anode plates 21 within a cell are electrically connected together by an anode-connector bar 24 and the lead oxide cathode plates 22 within a cell are electrically joined together by a cathode-connector bar 25. Anode terminal 26 extends upwardly from anode-connector bar 24 through cover 15 and cathode terminal 27 extends upwardly from cathode-connector bar 26 through cover 15. The various cells within the casing are ordinarily separated by wall partitions, not shown, and the cells are usually joined together by proper electrical connections between the respective terminals or may be joined by intercell connectors through the partition walls. Electrically nonconductive separators 23 are located between adjacent cathode and anode plates to prevent them from electrically shorting together. Casing R has a liquid fillable internal volume V that specifically excludes that volume occupied by the anode plates 21, the cathode plates 22, the separators 23, the ribs 18, etc.

The magnesium metal component of the present invention is disposed within the internal volume V of casing R in such a manner that the electrically conductive magnesium metal does not short circuit any anode 21 to any cathode 22 within a battery cell. Two such locations are shown in the drawing, to wit: magnesium metal pellets 100 being loosely disposed in sediment well 19 or malleable magnesium strips 200 being hooked over the top end of anodes 21 and disposed between the anode and an adjacent separator 23. Whether in pellet or strip or any other form, when cold dilute sulfuric acid electrolyte E is poured or injected into battery casing R, the following exothermic chemical reaction takes place immediately:

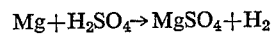

Accompanying the formation of magnesium sulfate and hydrogen gas, there is evolved heat in the amount of 110 kcals. per mol of magnesium reacting, said evolved heat serving to raise the temperature within the lead-acid battery whereby the ampere-hour capacity of the freshly activated battery is concomitantly increased. For example, in a conventional twelve volt six-cell automobile battery at 15° F. having a specific heat of about 0.823 kcal./° C. weighing about 26 pounds (consisting of about 550 grams per cell rubber-type separators, about 1,100 grams per cell of metallic lead which includes anodic active material, grids, posts and connectors, and about 300 grams per cell of lead dioxide cathodic active material), and with 30 grams (5 grams per cell) of magnesium metal pellets 100 having less than 0.004% manganese and having a specific surface of about 50 square centimeters per gram located in the sediment well, the injection of 750 grams per cell of a 35% by weight aqueous sulfuric acid solution at 15° F. into the said battery provides, within about ten minutes, an activated lead-acid battery having a temperature of about 98° F. Neither structural damage to the conventional battery casing nor volatilization of the electrolyte occurs. For test purposes a battery activated in this manner will deliver 150 amps for about 3.70 minutes before the battery is discharged to 1.0 volt per cell. If only 20 grams (3.3 grams per cell) magnesium metal is employed, the battery temperature reaches approximately 81° F. within 10 minutes and a borderline acceptable capacity which, under test, will deliver 150 amps for about 2½ minutes before the battery is discharged to 1 volt per cell. When 40 grams (6.6 grams per cell) magnesium metal is employed, the battery temperature reaches about 110° F. within ten minutes, and will deliver 150 amps for about 5 minutes before the battery is discharged to 1 volt per cell. Tests have indicated that the use of more than 0.15 mole magnesium per mole sulfuric acid at a 35% by weight concentration in water is apt to boil the electrolyte and crack the battery casing.

The preceding paragraph briefly describes a typical embodiment of the present invention. Certain parameters will now be described that are necessary in the activation of lead-acid type batteries utilizing cold sulfuric acid solution electrolyte. One parameter of the present invention requires that there is sufficient sulfuric acid present within the battery casing so that after the exothermic reaction between a portion of the sulfuric acid and the magnesium metal takes place to heat the battery to an efficient level, there remains enough sulfuric acid to furnish a supporting electrolyte so that the battery can function normally to its rated capacity. As is well known in the art, proper electrolytic action by the sulfuric acid on the battery plates requires at least two mols sulfuric acid for each mol lead oxide cathode, and this invention requires at least said amount of sulfuric acid.

A second parameter of the present invention requires that at least a portion of the excess sulfuric acid react exothermically with sufficient magnesium metal to provide at least fifteen (15) kcals. and not more than about thirty (30) kcals. per cell for the aforedescribed typical six-cell lead-acid battery weighing in the order of about 26 pounds. If less than about 15 kcals. of exothermic reaction heat is provided per cell, the temperature rise in a cold battery activated with 15° F. sulfuric acid solution is insufficient to increase the battery capacity to the desired level; if more than about 30 kcals. of exothermic reaction heat is provided per cell, the sulfuric acid solution electrolyte is apt to boil and the battery casing is apt to crack. Thus in the battery used in the earlier example which contains per cell about 300 grams of 1⅓ mols lead dioxide cathodic active material and an approximate corresponding amount of anodic active material, into which is added 750 grams per cell of 35% sulfuric acid solution at 15° F. for about 2.7 mols actual sulfuric acid, something in the range of 3.4 grams (0.14 mol) to 6.8 grams (0.28 mol) magnesium metal is required per cell for the desired temperature rise of the freshly activated battery. The preferred mole ratio of magnesium to lead oxide being substantially within the range of about 0.10–0.20. For this quantity range magnesium metal per cell, the magnesium metal reacts with about 5–10% of the sulfuric acid on a mol basis and with about 5½–11% of the sulfuric acid on a weight basis.

A third parameter of the present invention requires that the magnesium metal be relatively free of manganese impurity, it being found that the manganous ions may cause deterioration of the separator material. Specifically, the manganous ion can be electrochemically oxidized to the permanganate ion which will cause oxidative degradation of the separator material, especially phenolic resin impregnated paper used in most automotive batteries. For this reason the magnesium metal employed must contain less than 0.01% manganese impurity and preferably less than 0.004% and the total amount of manganese per cell must be less than about .0007 gram for the ordinary lead-acid battery.

A fourth parameter of the present invention requires that the previously specified amounts of magnesium metal react with stoichiometric amounts of the cold sulfuric acid within about ten minutes to provide the desired temperature rise and concomitant battery capacity within a short time. Yet the specified amounts of magnesium metal must not react too quickly with the sulfuric acid (faster than about one minute) because hydrogen gas would likely evolve violently and the battery casing would be apt to crack, or the sulfuric acid would be apt to spew out of the filling neck 17. To ensure that the desired exothermic chemical reaction will take place within ten minutes, the specific surface area of the magnesium metal must exceed 3 square centimeters per gram magnesium. There are basically two ways of slowing the rate of the exothermic chemical reaction to at least one minute. One way is to provide a specific surface for the magnesium less than about 1,500 square centimeters per gram magnesium. Another way is to employ a magnesium-aluminum alloy containing 3.6% aluminum and substantially 94.97% magnesium; when such alloys are used the specific surface of the alloy might be somewhat greater than 1,500 square centimeters per gram, yet less than about 3,000 square centimeters per gram. As has been previously alluded to, the use of more than 0.15 mol magnesium per mol sulfuric acid at a concentration of 35% by weight acid in water is apt to boil the electrolyte and crack the battery casing. As has also been previously mentioned, the magnesium metal might be present in the prescribed ratio in pelletized form 100 in the battery sediment well 19 or in strip form 200 attached to anode plates 21 or in other forms as well.

It has been found that small amounts, less than 5%, of other metals that are more chemically active than lead and have only one oxidation state could be alloyed with the magnesium. These would include, in addition to aluminum, elements such as sodium, calcium and barium and nonmetallic elements such as silicon.

From the foregoing the construction and operation of the battery activity technique will be readily understood and further explanation is believed to be unnecessary. However, since numerous modifications and change will readily occur to those skilled in the art, it is not desired to limit the invention to the exact construction shown and described, and accordingly, all suitable modifications and equivalents may be resorted to, falling within the scope of the appended claims.

I claim:
1. A lead-acid storage battery comprising a hollow casing containing a plurality of cells disposed within said casing each cell including lead anode plates, lead oxide cathode plates and electrically nonconductive separators disposed therebetween, the improvement comprising: mag- nesium metal disposed within said hollow casing located so as to not electrically connect a cathode to an anode, said magnesium metal being relatively free of manganese and containing less than about 0.010% manganese, said magnesium metal having a surface area within the range of about 3–3,000 square centimeters per gram of magnesium, the mol ratio of magnesium to lead oxide being substantially within the range of about 0.10–0.20.

2. The lead-acid storage battery of claim 1 wherein the magnesium metal contains less than about .004% manganese.

3. The lead-acid storage battery of claim 2 wherein the magnesium metal is in elongate strip form and attached to at least one anode plate.

4. The lead-acid storage battery of claim 3 wherein the magnesium metal is alloyed with a metal which is characterized by being more chemically active than lead and having only one oxidation state, said alloy containing less than 5% of said metal, the remainder being magnesium.

5. The lead-acid battery of claim 4 wherein the alloying metal is chosen from the class consisting of sodium, calcuim, barium and aluminum.

6. The lead-acid storage battery of claim 5 wherein the magnesium metal is alloyed with aluminum whereby said alloy contains 3–6% aluminum and 94–97% magnesium.

7. The lead-acid storage battery of claim 1 further including: a liquid electrolyte disposed in said casing at an initial temperature below about 25° F. and comprising a mixture of about one part by weight sulphuric acid and about two parts by weight water.

8. The lead-acid storage battery of claim 7 wherein the mol ratio of magnesium metal to sulphuric acid is substantially in the range of about 0.05–0.15.

9. The lead-acid storage battery of claim 1 wherein the magnesium is alloyed with less than 5% silicon.

References Cited

UNITED STATES PATENTS

| | | | |
|---|---|---|---|
| 1,215,907 | 2/1917 | Carpenter | 136—26 |
| 1,750,230 | 3/1930 | Leitner | 136—26 |
| 2,615,933 | 10/1952 | Carlson et al. | 136—161 |
| 2,700,064 | 1/1955 | Akerman | 136—161 |
| 2,761,006 | 8/1956 | Kramer | 136—161 |

OTHER REFERENCES

Yamaura et al.: Japanese publication 28–3770, No. 3,770/53, Aug. 7, 1953.

WINSTON A. DOUGLAS, Primary Examiner

A. SKAPARS, Assistant Examiner